United States Patent [19]

Zippel

[11] 4,178,048
[45] Dec. 11, 1979

[54] CURVED GUIDE FOR PATERNOSTER-TYPE DOCUMENT CARRIERS

[75] Inventor: Herbert Zippel, Altdorf, Fed. Rep. of Germany

[73] Assignee: Herbert Zippel Gmbh & Co. KG, Nuremberg, Fed. Rep. of Germany

[21] Appl. No.: 886,936

[22] Filed: Mar. 15, 1978

[30] Foreign Application Priority Data

Apr. 19, 1977 [DE] Fed. Rep. of Germany ....... 2717319

[51] Int. Cl.² ............................................. A47B 49/00
[52] U.S. Cl. .................................... 312/267; 312/268; 312/134; 198/799
[58] Field of Search ............... 312/268, 267, 223, 134; 198/799

[56] References Cited

U.S. PATENT DOCUMENTS

| | | | |
|---|---|---|---|
| 2,512,684 | 6/1950 | Shontz, Jr. | 312/268 |
| 3,141,123 | 7/1964 | Olson | 312/268 |
| 3,240,546 | 3/1966 | Gibbons | 312/267 |
| 3,578,832 | 5/1971 | Toms | 312/268 |
| 3,985,206 | 10/1976 | Cantos | 312/268 |

FOREIGN PATENT DOCUMENTS

| | | | |
|---|---|---|---|
| 1153721 | 1/1962 | Fed. Rep. of Germany | 312/268 |
| 1167311 | 11/1962 | Fed. Rep. of Germany | 312/268 |
| 1013075 | 12/1965 | United Kingdom | 312/268 |
| 1215469 | 12/1970 | United Kingdom | 312/268 |

*Primary Examiner*—Victor N. Sakran
*Attorney, Agent, or Firm*—Darby & Darby

[57] ABSTRACT

A curved guide for paternoster-type document carriers of the type wherein at least one carrier is connected by a support arm rotatably articulated on each front side to an endlessly moving chain, said carrier being conducted by means of a bent lever attached to the front side of each carrier in an inverted V-shaped position with the aid of guide rollers provided at the lever ends and running in slotted guideways which intersect at the two deflection points, wherein the improvement comprises a pair of pivotally mounted and automatically settable or reversible point levers at the guideway intersection. The point levers close the respective entrance and exit of one slotted guideway from the other slotted guideway with the sides of the point levers forming a continuous slotted guideway bridging the entrance and exit of the other slotted guideway. The point levers are coupled by an endless chain. A rubber-metal buffer cushion adjacent the obtusely converging sidewalls of the slotted guideways reduces noise and insures an elastic impact of the point levers against the buffer cushion.

5 Claims, 4 Drawing Figures

CURVED GUIDE FOR PATERNOSTER-TYPE DOCUMENT CARRIERS

BACKGROUND OF THE INVENTION

This invention relates to a curved guide for paternoster-type document carriers, each carrier being connected with the aid of a support arm rotatably articulated on each front side to an endlessly moving chain and each carrier being conducted by means of a bent lever attached to each front side of each carrier in an inverted V-shaped position with the aid of guide rollers provided at the lever ends and running in slotted guideways which intersect at the two deflection points.

A curved guide of this type is already known, for example, from German patent specification No. 1,436,231. The paternoster-type document carriers include a rotatably mounted support arm on each front side articulating with the pivot pin which supports the respectively associated bent lever in a non-rotatable fashion. Said rotatably mounted support arm is connected via a joint with the endless driven chain. Each support arm is extended beyond said joint, the extension having an inverted T-shaped configuration. The flanges of the extension are perpendicular to the longitudinal direction of the support arm and are provided at their free ends with a guide roller (or caster) which move in succession in the direction of motion in a special slotted guideway extending between the chain segments. Such an arrangement and guide system for the carriers subjects the chain only to the carried weight and excludes any and all derailing and outwardly directed forces, thus ensuring reliable and low-noise operation of the registry equipped with paternoster-type carriers.

In particular when the paternoster-type carriers are operated at higher speeds, it has been found that, due to the increased accelerations and decelerations occurring at the sites of deflection, a certain amount of rough or bumpy operation results in the carriers which pass through these deflection sites and which, in addition, carry very different loads. The first cause of such bumpy operation is due to the fact that the centers of the pivotal axis for the guide wheel, the support arms of the next successive carrier and one arm of the bent levers firmly secured to the associated pivot pin of the carrier together form a straight line, thereby producing a knee lever on the front side of each carrier which is suddenly pushed through due to the concomitant pull of the support arm as the chain continues to run. A certain amount of swaying and pendulous oscillation of the respective carrier is caused because the outer guide roller (or caster) located on the afore-mentioned straight line has no guidance in such a position in the direction of the pendulous movement of the carrier at the moment this knee lever is formed and because the inner guide roller of the other bent lever has a certain amount of play in its slotted guideway, just like the outer guide roller.

The bumpy operation of the carriers caused at the site of deflection for a number of reasons in conjunction with a certain amount of deformation or buckling capacity has resulted in the following situation: in the intersection the leading guide roller of a bent lever has entered the wrong slotted guideway, thereby twisting the carrier which is formed, for example, by a frame to receiving hanging or other suspended files in a corkscrew-like configuration resulting in considerable damage to the document containers. In particular, such incidents result in annoying interruptions of operation and high repair costs.

The carriers, however, could be designated to be so stable as to eliminate any possibility of their being twisted or deformed. In view of the relatively long length of these carriers, however, such a step would increase the inherent weight of the carriers to such an extent that they would become uneconomical to manufacture, particularly since this would also entail the necessity of reinforcing other structural parts of the moving registry.

The object of the instant invention is therefore to further develop the known curved guide for paternoster-type document carriers using the other features already mentioned in the first paragraph at the outset in such a way that the guide rollers of each bent lever secured to a carrier can be reliably moved in the intersection into the associated slotted guideway by employing simple and economically feasible measures while retaining the document carriers known hitherto.

BRIEF SUMMARY OF THE INVENTION

In accordance with the invention this object is accomplished in that in the intersection the respective entrance and exit of one slotted guideway into the other slotted guideway can be closed by a pivotally mounted and automatically settable or reversible point lever and that both point levers are coupled together (interlinked) and are designed in such a way that the lever sides of the correspondingly pivoted point lever which form a continuous slotted guideway bridge the entrance and exit of said other slotted guideway almost without a break.

Even in the case of a carrier which nevertheless does twist somewhat in the intersection area, these measures can ensure that the guide rollers will not enter the wrong slotted guideway, since the leading guide roller of a bent lever causes the interconnected point levers to necessarily be pivoted such that its slotted guideway extends without interruption through the intersection to the associated ensuing slotted guideway on the other side. The trailing guide rollers of the same bent levers pivot the point levers back into their original position and lock the entrance and exit of the first afore-mentioned slotted guideway so that the second guideway now extends without interruption through the intersection as well.

In particular, the design can be executed in such a manner that a pivot for the associated one-arm point lever is provided in each area of the side walls of said intersecting slotted guideways which converge at an acute angle so as to be symmetrical thereto, said pivot being formed by a rotatably mounted pivot pin which is arranged perpendicular to the base of said slotted guideway and at whose upper end the point lever is non-rotatably secured.

Such an arrangement allows both the entrance and exit, which lie adjacent one another in the intersection, to be bridged in a structurally simple manner by one and the same point lever. The pivots of said two point levers are close to one another so that they can be coupled together in a simple manner.

It is provided in a preferred embodiment that, for this purpose, a chain sprocket is non-rotatably provided at the lower end projecting out from said pivot of each pivot pin connected to a point lever, and that the two chain sprockets of said point levers intermesh via an endless chain.

The coupling of the point levers is accomplished in such a way that they are always pivoted in the same direction. A linkage mechanism can also be provided as the connection in place of a coupling consisting of chain sprockets and an endless chain. Such a linkage mechanism is advantageous because it is economical to manufacture and because it requires less maintenance.

BRIEF DESCRIPTION OF THE DRAWINGS

The invention will now be explained in more detail in the following with reference to an embodiment which reveals other inventive features. In the drawing.

DETAILED DESCRIPTION OF A PREFERRED EMBODIMENT

Figure 1:
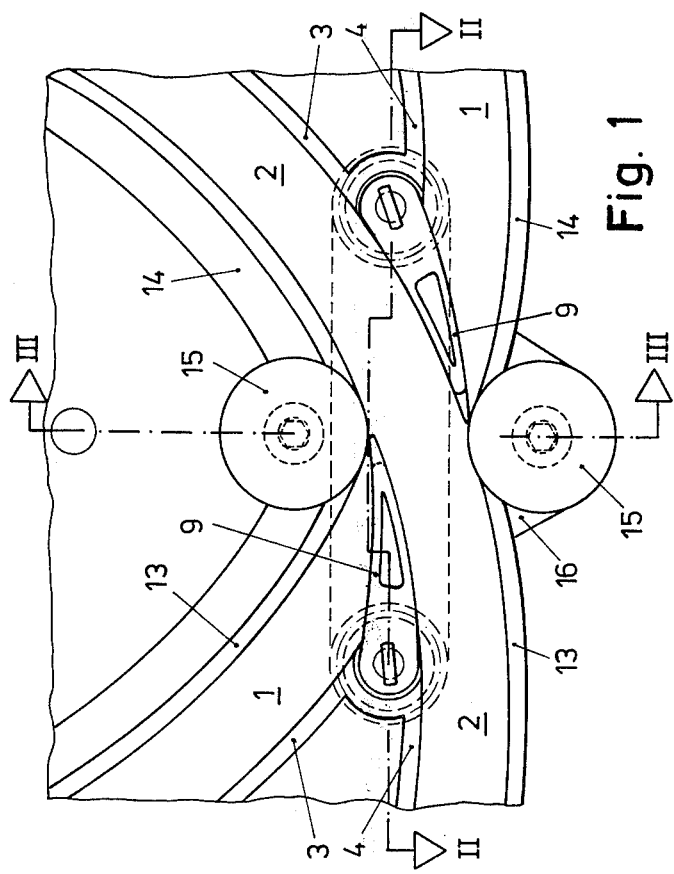
FIG. 1 is the schematic view of the lower intersection area of one side of a driving apparatus for a registry with paternoster-type document carriers, as shown in circle A of FIG. 4.
Figure 2:
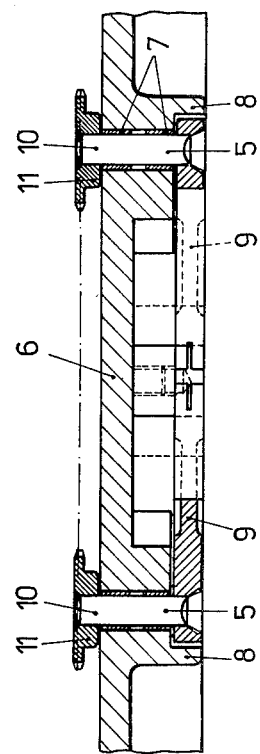
FIG. 2 is a top elevation along a section through the intersection along line II—II in FIG. 1.
Figure 3:
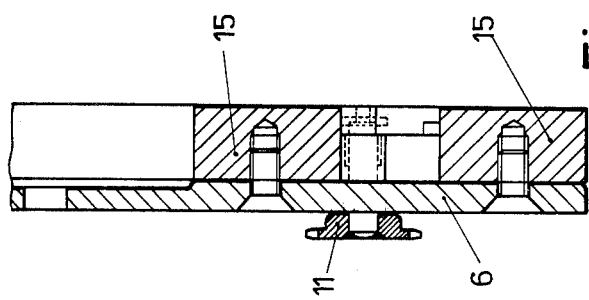
FIG. 3 is a vertical section through the intersection along line III—III in FIG. 1.
Figure 4:
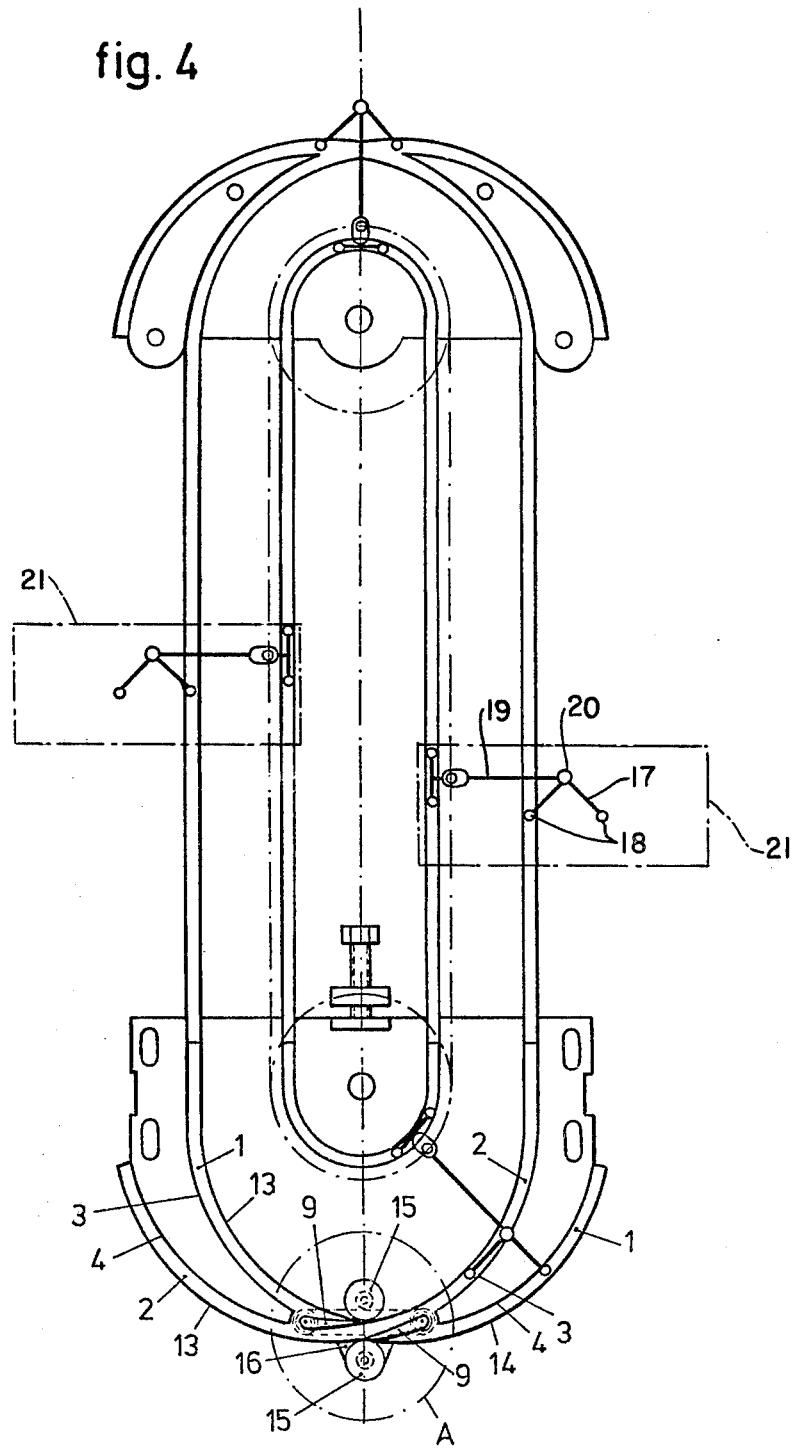
FIG. 4 is a schematic view illustrating an arrangement for guiding the carriers.

The illustrated lower intersection of two slotted guideways 1 and 2 belongs to one side of a driving apparatus for a registry with paternoster-type document carriers which is normally positioned on the inner side of each side wall, for example, of a cabinet, console or the like. The guide rollers 18 which are rotatably mounted at the ends of the arms of an equal-armed bent lever 17 are conveyed in the two slotted guideways 1 and 2. Such a bent lever 17 is non-rotatably secured in an inverted V-shaped position on a trunnion 20 respectively located on each front side of a carrier 21 so that the associated carrier 21 is maintained in a position parallel to itself throughout the paternoster-type movement. Each carrier 21 is articulately connected with the endless moving chains by means of two support arms 19 rotatably mounted on the two trunnions on the front walls. The structure and the mode of function of one side of the driving apparatus including its details (see FIG. 4), however, are already known so that a more detailed explanation is superfluous, particularly since the configuration of one complete side of the driving apparatus is not included in the invention.

For the reasons stated hereinbefore, the invention solely deals with guiding the guide rollers 18 which as carriers for suspended files are at the same height relative to the base or the frame extending in a horizontal plane and which belong to the bent lever 17 disposed in an inverted V-shaped position on each front side of said carriers 21, through each intersection of the driving apparatus sides in such a way that the entering guide roller 18 cannot enter the wrong slotted guideway at the other end of the intersection due to the action of the bumpy operation prevailing here.

For this purpose, a pivot which is respectively formed by a pin 5 extending perpendicular to the base of the slotted guideways is provided in each area of two side walls 3 and 4 of said intersecting slotted guideways 1 and 2 which converge at an acute angle so as to be symmetrical to said side walls. The intersection adjacent each site of deflection of the paternoster-type registry constitutes an integral cast or pressed piece of metal or plastic consisting essentially of a plate 6 attached to the side walls of the cabinet, console or the same, on which are integrally formed the intersecting slotted guideways 1 and 2 in accordance with the size of the plate encompassing the site of deflection. At the same time, the plate functions as the base of the slotted guideways. The two pins 5 are rotatably mounted by means of slide bushings 7 in a hole 8 provided in the plate 6 and are non-rotatably connected at their upper ends with a one-arm point lever 9. A point lever 9 is long enough to bridge both the entrance and exit of the intersecting slotted guideways 1 and 2 adjacent to a pin 5 by correspondingly pivoting the associated point lever 9.

Each point lever 9 has a cross section which tapers towards its free end in the shape of a wedge and is designed such that the lever sides which respectively form a continuous slotted guideway close or bridge the entrance and exit of said other guideway without a break or interruption and in a manner adapted to the curvature of the respective slotted guideway. The height and thickness of the point levers 9 are substantially smaller than the height of the side walls of the slotted guideways 1 and 2, since it suffices along the relatively short path of an entrance or exit if the guide roller which passes between two point levers 9 is conducted in the upper third of its height.

For example, a point lever 9 which closes the respective slotted guideways 1 or 2 is pivoted by the leading guide roller of the bent lever secured to the front sides of a carrier located at the point of deflection at that very moment. It thus closes the adjacent entrance to the other guideway 2 or 1 for the trailing guide rollers. Now, so that the leading guide roller cannot impinge on the closed entrance of the same slotted guideway as it continues to move, the two point levers 9 are coupled together in such a way that they always pivot in the same rotational direction. Hence, if a point lever 9 closing the entrance to a slotted guideway is pivoted by the leading guide roller, the other point lever closing the exit from this slotted guideway will also be pivoted automatically in the same direction, thereby presenting to the continuing guide roller an open exit. The guide roller is reliably guided on both sides and can pass through the intersection.

In order to couple the two point levers 9 together, each of the pins 5 forming their pivots passes through the plate 6 and projects beyond the rear side thereof. In the embodiment, a chain sprocket 11 is non-rotatably secured to each extended pin end 10. The two chain sprockets 11 are now coupled together or are caused to intermesh with the aid of an endless chain 12 so that every pivotal movement of the one point lever will cause the pivotal movement of the other point lever in the same direction.

A coupling consisting of a chain sprocket and an endless chain can also be replaced by a linkage of articulately interconnected lever arms.

For the purpose of reducing noise and ensuring an elastic impact of the pivotal point levers at the joint opposite the pivot formed by the two obtusely converging side walls 13 and 14 of the two intersecting slotted guideways 1 and 2, the design is conceived such that the lever arm of a point lever respectively closing an entrance or exit in the intersection co-operates at its free end with a rubber-metal buffer cushion 15 which is disposed or screwed into position on the plate 6 so that it is symmetrical to the imaginary junction of the obtusely converging side walls 13 and 14 of the intersecting slotted guideways 1 and 2. The obtusely converging side walls 13 and 14 are of course recessed in the area of the imaginary point of junction to such an extent that a portion of the peripheral surface of each metal-rubber buffer cushion 15 forms a portion of the inner side of these side walls.

In the event that the lower side walls 13 and 14 of the intersecting slotted guideways 1 and 2 simultaneously form the corresponding boundary of the plate 6 or the moulded piece containing the intersection, the lower or outer rubber-metal buffer cushion 15 is attached to a flange 16 formed on the lower side walls 13 and 14 symmetrical to their imaginary junction.

What is claimed is:

1. A curved guide for paternoster-type document carriers of the type wherein each carrier is connected by a support arm rotatably articulated on each front side to an endlessly moving chain, said carrier being conducted by means of a bent lever attached to each front side of each carrier in an inverted V-shaped position with the aid of guide rollers provided at the lever ends and running in slotted guideways which intersect at the two deflection points wherein the improvement comprises a pair of pivotally mounted and automatically settable point levers at the guideway intersection, said levers closing the respective entrance and exit of one slotted guideway from the other slotted guideway, the sides of said levers forming a continuous slotted guideway bridging the entrance and exit of said other slotted guideway substantially without a break and means for coupling said point levers, wherein said coupling means comprises a non-rotatable chain sprocket at each point lever and an endless chain intermeshing said chain sprockets.

2. A curved guide according to claim 1 wherein the side walls of said intersecting guideways converge at an acute angle, further comprising a pair of rotatably mounted pivot pins arranged symmetrically to said converging side walls and perpendicularly to the base of said slotted guideways adjacent said deflection point, said point levers non-rotatably secured to the upper end of said pivot pins.

3. A curved guide according to claim 1 wherein said coupling means pivots said point levers in the same rotational direction.

4. A curved guide according to claims 1 or 2, wherein each point lever has a cross-sectional configuration which converges towards its free end in the shape of a wedge further comprising a rubber-metal buffer cushion respectively positioned adjacent the obtusely converging side walls of the intersecting slotted guideways so as to be symmetrical thereto, the peripheral surface of said cushion forming part of the inner side of side walls, each said point lever cooperating with said rubber-metal cushion.

5. A curved guide according to claim 4, wherein said rubber-metal buffer cushion is secured to a flange formed on the side walls of said slotted guideways and said intersection comprises an integrally moulded member.

* * * * *